(12) United States Patent
Shankar et al.

(10) Patent No.: US 9,282,092 B1
(45) Date of Patent: Mar. 8, 2016

(54) SYSTEMS AND METHODS FOR DETERMINING TRUST WHEN INTERACTING WITH ONLINE RESOURCES

(71) Applicant: GOOGLE INC., Mountain View, CA (US)

(72) Inventors: Umesh Shankar, New York, NY (US); Joesph Bonneau, New York, NY (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/790,908

(22) Filed: Mar. 8, 2013

Related U.S. Application Data

(60) Provisional application No. 61/618,320, filed on Mar. 30, 2012.

(51) Int. Cl.
*H04L 29/06* (2006.01)

(52) U.S. Cl.
CPC .................. *H04L 63/0823* (2013.01)

(58) Field of Classification Search
CPC .......... H04L 29/06; H04L 29/08; G06F 21/00
See application file for complete search history.

(56) References Cited

U.S. PATENT DOCUMENTS

| | | | |
|---|---|---|---|
| 8,286,239 B1* | 10/2012 | Sutton ............................. | 726/22 |
| 8,572,129 B1* | 10/2013 | Lee et al. ...................... | 707/798 |
| 8,656,463 B2* | 2/2014 | Callahan et al. .................. | 726/4 |
| 2002/0038291 A1* | 3/2002 | Petersen et al. ................. | 705/67 |
| 2010/0299520 A1* | 11/2010 | Murakawa ..................... | 713/156 |
| 2011/0213966 A1* | 9/2011 | Fu et al. ........................ | 713/158 |
| 2013/0166907 A1* | 6/2013 | Brown et al. ................. | 713/156 |

OTHER PUBLICATIONS

CyptoIDs. http://www.google.com/...A%2F%2Fwww.trevp.net%2FcryptoID%2F&sa=D&sntz=1&usg=AFQjCNGZV3ZwjNY79WC6I0YdZTp5L9uo__A[Mar. 5, 2013 5:44:02 PM]. Presented at NSPW 2003.

* cited by examiner

*Primary Examiner* — Jeffrey Pwu
*Assistant Examiner* — Wasika Nipa
(74) *Attorney, Agent, or Firm* — Procopio, Cory, Hargreaves & Savitch LLP

(57) ABSTRACT

Systems and methods for determining trust when interacting with online resources are described, including requesting a secure connection with an online resource; receiving a certificate from the online resource, wherein the certificate is signed by a chain of at least one certificate authority (CA) with the last CA in the chain being a root CA; determining that the root CA is an entity root CA without determining whether the root CA is a third-party root CA, wherein the entity root CA is associated with an entity certificate issued to an entity and the entity is associated with a score; determining whether the score is equal to or greater than a threshold; and, if the score is equal to or greater than the threshold, establishing the secure connection with the online resource.

19 Claims, 3 Drawing Sheets

SYSTEMS AND METHODS FOR DETERMINING TRUST WHEN INTERACTING WITH ONLINE RESOURCES

CROSS-REFERENCE TO RELATED APPLICATIONS

This application is a non-provisional of U.S. Provisional Patent Application No. 61/618,320, filed Mar. 30, 2012, the entire contents of which are incorporated herein in their entirety by reference.

BACKGROUND

1. Technical Field

The discussion below relates generally to online data processing and, more particularly, to systems and methods for determining trust when interacting with online resources.

2. Related Background

An online party establishes trust using a certificate. For example, when a browser accesses a website using the Hypertext Transfer Protocol Secure (HTTPS) protocol or the Secure Sockets Layer (SSL) protocol, the website establishes trust by sending a certificate signed by a trusted certificate authority (CA or "root CA"). The certificate is based on "domain name binding," which means that the certificate is issued only for a specific domain name and is only valid for that specific domain name, which can be identified using a universal resource locator (URL). This may be referred to as "domain-based trust."

Domain-based trust, however, may not be user-friendly. For example, different domain names can be confusingly similar (e.g., usersalliance.com, useralliance.com, and usersaliance.com). When a user unintentionally accesses a website created to deceive the user (e.g., useralliance.com), that website may present a valid certificate issued to and possibly stolen from another website (e.g., usersalliance.com) that the user may have intended to access. The user's browser may detect that "useralliance.com" is not the same as "usersalliance.com," and ask the user whether he or she would like to continue accessing useralliance.com (the unintentionally accessed website).

Since useralliance.com was created with a confusingly similar name in a manner that may have been intended to deceive the user, the user may not realize that an "s" is missing, and thus may incorrectly respond (e.g., "Yes, continue accessing."). The deceiving website useralliance.com may then present or mimic the web pages that the user is led to believe he or she is accessing (e.g., legitimate web pages) to improperly induce the user to provide personal information, financial information, or other valuable information.

Another problem with domain-based trust is that the certificate issued for one domain name is not valid for another domain name owned by the same entity. For example, a financial institution (e.g., Best FI) may own BestFIcards.com, BestFIbank.com, and onlineBestFIaccount.com. The financial institution "Best FI" would require separate certificates for each of those domain names to use them in online financial transactions with its customers. If Best FI decides to change the name of one of the three domain names or add another domain (e.g., for website access, email signing, code signing, or other function), the financial institution "Best FI" would need to obtain a new certificate.

DETAILED DESCRIPTION

The subject matter described herein is taught by way of example implementations. Various details have been omitted for the sake of clarity and to avoid obscuring the subject matter. Examples shown below are directed to structures and functions for implementing systems and methods for determining trust when interacting with online resources.

Figure 1:
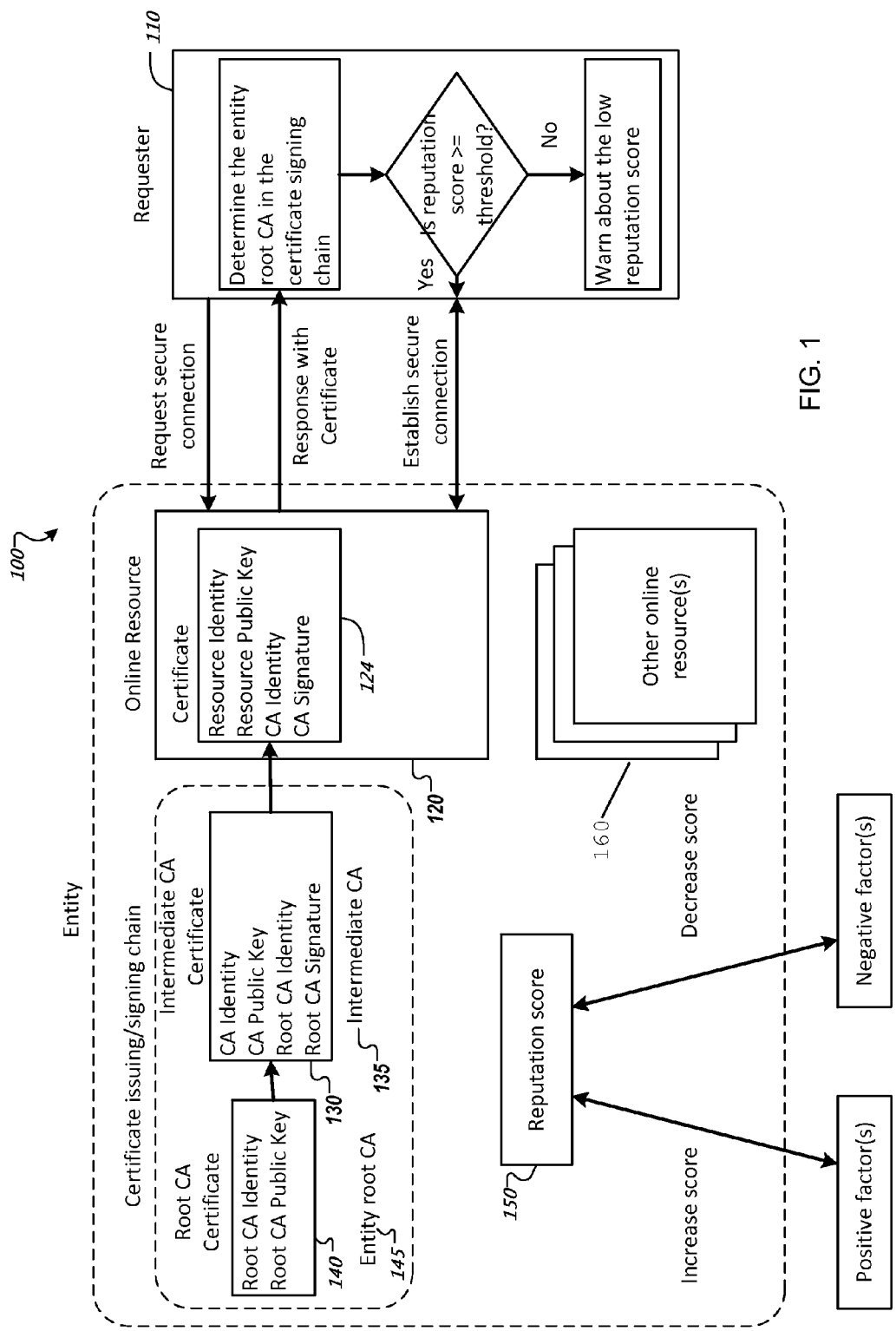
FIG. 1 shows an example data flow in an example system suitable for implementing some example implementations.

FIG. 1 shows an example data flow in an example system suitable for implementing some example implementations. System 100 includes a requester 110 that initiates or requests a secure connection with an online resource 120. The request may be an HTTPS or SSL request (e.g., requesting a secure page), a request for a secure email communication, a request to authenticate executable instructions (e.g., code signing), or any other suitable request for a secure communication or access to a resource.

In response, the online resource 120 (e.g., a website) may send a certificate 124, which may include a public key of the online resource 120 (e.g., "Resource Public Key"). The certificate 124 may include other information (e.g., "Resource Identity"). Requester 110 then determines the trustworthiness of the online resource 120 by checking that certificate 124 is issued by the same entity that owns the online resource 120. This may be determined by identifying the root certificate authority (CA) in a certificate issuing/signing chain, and determining that the root CA is an entity root CA 145.

A certificate authority (CA) is a party that may issue certificates. The CA uses a certificate associated with it (e.g., CA certificate) to sign the issued certificates. An issued certificate "signed by a CA certificate," in some example implementations, refers to binding the public key of the CA certificate to the issued certificate, thus passing the trust of the CA to the holder of the issued certificate. In some example implementations, a certificate may be issued for a limited duration (e.g., a duration in terms of a number of weeks, months, years, or other unit).

A certificate issuing/signing chain is a chain of trust leading to a trusted root CA. Regardless of the length of the certificate issuing/signing chain, the last CA in the chain is a root CA. In this example, the root CA is an entity root CA 145. An "entity root CA" refers to a root CA or simply a CA associated with a root certificate issued to and owned by an entity that also owns the online resource 120. In other words, the entity itself functions as a root CA to issue certificates used within the entity.

To determine the entity root CA 145, requester 110 may traverse up the certificate issuing/signing chain. In some example implementations, certificate 124 may be issued by a root CA (e.g., certificate 124 is signed by the certificate of the root CA). In other example implementations, as in FIG. 1, certificate 124 may be issued by an intermediate CA 135 (e.g., certificate 124 is signed by an intermediate CA certificate 130). The intermediate CA certificate 130, in turn, may be issued by another intermediate CA (not shown) or a root CA (e.g., the intermediate CA certificate 130 is signed by a root CA certificate 140). When the root CA is an entity root CA 145, the entity is determined. For example, the entity may be identified by looking up the "Root CA Identity" in the root CA certificate 140.

Determining trustworthiness based on an entity root CA or entity may be referred to as "entity-based trust" (e.g., trust of the entity is passed down to the online resource 120 through the certificate issuing/signing chain). An entity root certificate (e.g., root CA certificate 140), used by an entity root CA 145 to sign other certificates of the entity, may be generated by and issued to the entity itself (e.g., a self-issued root certificate). In some example implementations, an entity root certificate issued to an entity may be generated or signed by a party outside of the entity (e.g., a third-party root CA). Examples of third-party root CAs, which may also be referred to as commercial CAs or trusted root CAs, include but are not limited to VeriSign, Comodo, Entrust, DigiCert, GeoTrust, Network Solutions, etc.

In some example implementations, an entity may be defined by a hierarchical or tree structure of certificates with the entity root CA certificate 140 as the root node of the structure. For example, an entity is the owner of all resources having certificates signed by certificate chains leading to the same entity root CA certificate 140. The root certificate of an entity may be used to sign certificates used in any resources (e.g., for SSL connection, email signing, code signing) owned by the entity. In some example implementations, some of the certificates signed by the entity root certificate may, in turn, be used to sign other certificates used within the entity. Certificates may include or omit domain names since the certificates are not used with a domain name to establish trust (e.g., not domain-name binding). In some example implementations, certificates used within an entity may include the identity of the entity.

After determining the root CA certificate 140 of an entity root CA 145, requester 110 does not need to determine whether the root CA certificate 140 is issued by a third-party CA. Thus, trustworthiness of a third party is not relied upon for the online resource 120. To establish the trustworthiness of the online resource 120, requester 110 may determine whether a reputation score 150 associated with the entity or the online resource is greater than or equal to a reputation threshold. If the reputation score 150 is less than the reputation threshold, requester 110 may issue a warning to the user (e.g., the user using requester 110 to access the online resource 120), with or without giving the user an opportunity to proceed with accessing the online resource 120.

If the reputation score is greater than or equal to the reputation threshold, a secure connection is established to the online resource 120. After the secure connection has been established, secure communication may be carried out between requester 110 and online resource 120.

Requester 110 establishing a secure connection may involve, for example, using the online resource's public key to encrypt a key of the requester 110, thus sending the encrypted key to the online resource 120, and other encrypted data that may be needed to establish the connection. Online resource 120 then decrypts the key of the requester 110 using its private key and uses the key of the requester 110 to decrypt the other encrypted data. After online resource 120 receives the key of the requester 110, online resource 120 and requester 110 may start using the key of the requestor 110 to communicate securely until the purpose of the secure communication has been achieved and the secure connection has been disconnected.

The reputation score 150 may be a reputation score associated with the online resource 120, entity root CA 140, another resource 160 owned by the same entity, the entity itself, or any combination thereof. For example, the reputation score may be a score associated with the entity which may be used to establish a secure connection to any resource owned by the entity. In some example implementations, there may be a single reputation score 150 for the entire entity. In other example implementations, two or more reputation scores may be used (e.g., a score for each resource, each line of business, each region, each resource, or another division). One or more reputation scores may be stored on the requester 110, online resource 120, another part of the entity, or a combination thereof.

Initially, or when the reputation score is below a minimum reputation threshold, trust may be bootstrapped from another reputation source. For example, when a site is visited for the first time, the user or a third party may provide an indication of trustworthiness. In some example implementations, the reputation score may be set to a level above the minimum reputation threshold if the entity root CA is signed by a chain of at least one CA, with the last CA in the chain being any third-party root CA providing certificate signing as a business. In other example implementations, third party trustworthiness is not relied on (e.g., the entity root CA is associated with an entity certificate issued by the entity itself).

According to at least one example implementation, the reputation score may be set to a level above the minimum reputation threshold if the business entity owns another resource 160 with a certificate signed by any third-party root CA (e.g., signed by a chain of at least one CA with the last CA in the chain being any third-party root CA).

There are factors that may increase or decrease the reputation score. For example, positive factors that may increase the reputation score may include the history of access to a resource owned by the entity. Another factor may be the history of one or more other resources 160 owned by the same entity. The longer the history (e.g., more usage data), the greater the increase of the reputation score. For example, a user's interaction history with one or more resources associated with an entity may be recorded and/or summarized by requester 110 (e.g., a browser, email provider, operating system, or any resource). The history of more than one resource may be combined to contribute to a higher reputation score.

Other positive factors may include the age of the resources or the entity itself (e.g., the reputation score may be increased by the increase in age of the resources). Additional positive factors may be factors associated with productive, enjoyable, or otherwise positive user experiences (e.g., a shopping card resource, a payment processing service, search engines, map resources, etc.). More than one factor may be combined to contribute to a higher reputation score.

Factors that may decrease the reputation score may include identification or indication by a user that one or more resources owned by the entity are unreliable or untrustworthy. Additional negative factors may include factors associated with a destructive, deceitful, or otherwise negative user experience (e.g., unstable application, mishandling of user data, confusing user interface, etc.).

Factors that may increase or decrease the reputation score may include interactions with the entity that are weighted by "closeness" in one or more social graphs or circles of the interacting users. For example, users on a social network can establish "circles" of relationships (e.g., family members and friends in one circle, hiking buddies or users having similar interests or hobbies in another circle, professional acquaintances in a third circle, etc.). The social graphs may be used as a natural defense against "poisoning attacks" and "Sybil attacks" (e.g., an attacker creates a large number of identities and uses them to elevate the reputation of a bad site or ruin the reputation of a good one). Since most users do not have attackers in their circles, weighting the opinion of users closer in the social graph would tend to remove bad actors.

In some example implementations, one or more user interface (UI) features (not shown) may be provided to users to indicate the use of the users' history and/or data in establishing trust with a resource (e.g., web service, email service, code execution, mobile applications, etc.). For example, data relating to a user's visits to a website may be shown (e.g., "You've interacted with this entity for two years, averaging 200 visits per month."). Email communication may be indicated (e.g., "You have received signed email."). Webmail or email may include an embedded tag indicating the entity name or identifier. A user installing a mobile application from an entity "Vanguard Mobile" may be shown that the application comes from the same entity "Vanguard" that the user has accessed before, by logging into one of its websites or using its services for N years, receiving M number of emails from the entity's email service, and/or performing T number of transactions with the entity. The data and statistics help assure the user that Vanguard Mobile is the "real" Vanguard the user has interacted with and trusted.

In some example implementations, one or more services (not shown) may be provided to protect users from, for example, phishing or other deceptive practices. For example, a user-facing device or interface (e.g., a browser, smartphone, login assistant or interface) may implement features that eliminate or minimize the need for a user to manually enter his or her login credentials (e.g., user name and/or password). Obviating the need to manual enter login credentials would eliminate the chances of manually entering the login credentials for a legitimate site into a malicious lookalike site. The user-facing device or interface may decide the credentials to use based on the entity name, which may be retrieved from an entity root CA.

Figure 2:
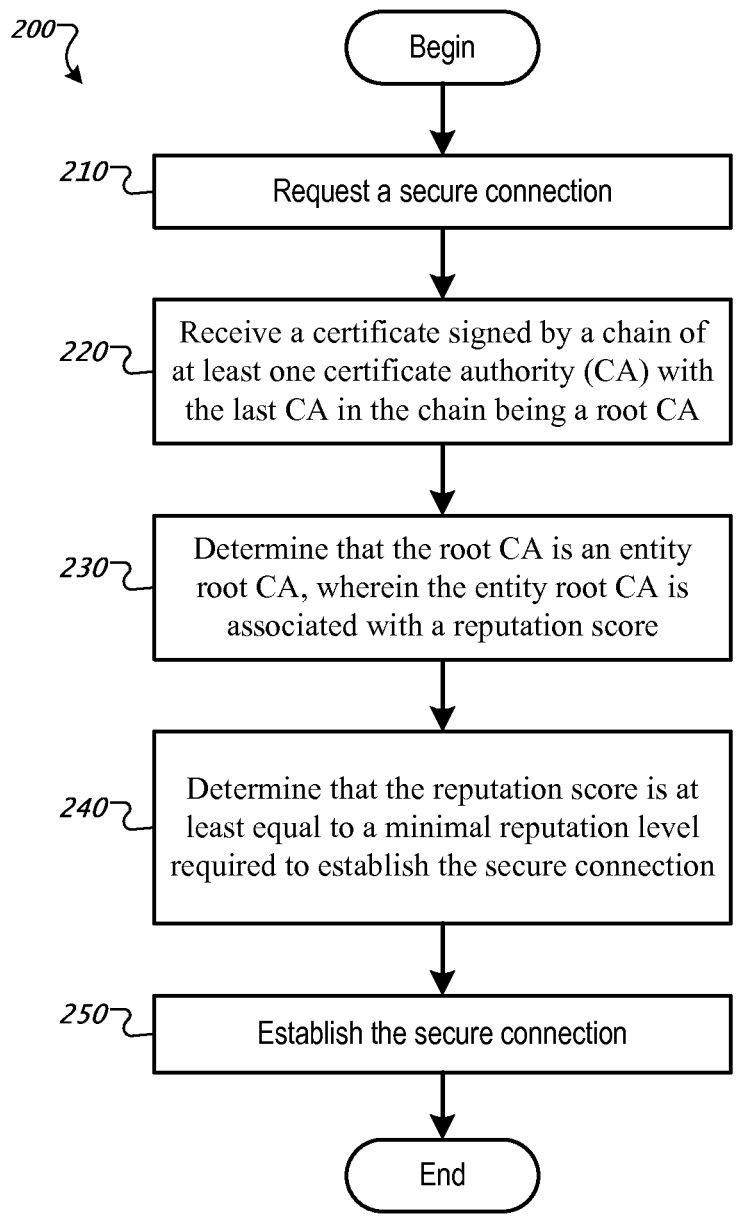
FIG. 2 shows an example process implementing at least one example implementation.

FIG. 2 shows an example process implementing at least one example implementation. A secure connection with an online resource is requested (210). A response from the online resource including a certificate is received (220). The certificate may be signed by a chain of at least one certificate authority (CA) with the last CA in the chain being a root CA. The root CA is determined to be an entity root CA and there is no need to determine that the root CA is a third-party root CA (230). The entity root CA has been issued to a business entity, which has an associated reputation score. The reputation score is determined to be at least equal to a minimum reputation threshold (240). The secure connection is established with the online resource (250).

In some examples, process 200 may be implemented with different, fewer, or more steps. Process 200 may be implemented as computer executable instructions, which can be stored on a medium, loaded onto one or more processors of one or more computing devices, and executed as a computer implemented method. An entity root CA may be used in place of a third-party root CA anywhere a third-party root CA can be used.

As an example, an entity root CA can be used to authenticate or provide trust to two or more resources of an entity or a brand of an entity. An entity root CA (or a third-party root CA) may be the root CA of a signing certificate chain that signs a brand dossier of the entity.

An entity may have businesses, services, products, assets, organizations, or resources in general in many namespaces. For example, the entities may own a number of domain names in the domain name system (DNS) namespace. Some of domain names and/or subdomain names of the entity may be signed by certificate authorities (CAs). The entity may have acquired or been assigned names in the namespaces of different social networks. The entity may provide services and/or applications on many platforms (e.g., in the namespaces of different operating systems for smartphones, tablets, computers, etc.). The larger the entity, the more resources it has in different namespaces for each of different brands.

A brand dossier signed by a public key (e.g., of a certificate 124, FIG. 1) provides a trusted mechanism to link or group together different names in various namespaces of a brand. The reputation established with different names of an entity or a brand of an entity can be preserved or united to lend support to new names of the brand. The new names may be in existing and/or new namespaces or platforms. For example, once a brand has acquired trustworthy and/or reputable recognition, the brand may, for example, provide a service H on a new social network Y in the namespace of social network Y. Instead of having to establish trust and/or reputation of service H from zero, the brand may quickly and easily show or "project" the brand's established trust and reputation to service H using a brand dossier.

Below is an example brand dossier shown as in the format of a dossier file. In implementation, the format and/or content of a dossier file may be different than what are shown below.

```
01 BRANDID: dubo9-sanre-wivip-wqsqy // short public key fingerprint
02 VERSION: 9071256
03 VALID-FROM: Jan 1 2013 00:00:00 UTC
04 VALID-TO: Dec 31 2013 23:59:59 UTC
05 SPKI: [a public key for this organization]
06 CANONICAL_LOCATIONS:  [domain name A] /wellknown/dossier,
07                       [domain name B] /foo/dossier
08 NAMES:
09    Namespace=[domain name X]
10       Name='Foo Inc.'
11       Locator='[domain name X] /foo'
12       Sig=[signature from Super Plus CA]
13    Namespace=web
14       Site=[domain name Y]
15       Name='Foo'
16       Locator='[domain name Y] /foo'
17    Namespace=EV cert
18       Name='Foo, Inc.'
19       Sig=[certificate]
20    Namespace=DNSSEC
21       Name='[domain name Z]'
22       Sig=[DNSSEC signature chain]
23    Namespace=SomeAppStore
24       Name='Foo developer coop'
25       Codesigningpubkey=[key]
26    Namespace=D-U-N-S
27       Name='Foo service'
28       Number=123456789
29 SIG: [signature on all of the above]
```

The example dossier file above is formatted for human readable for discussion, which may not be necessary in actual implementation. The example dossier file is shown with line numbers for discussion, which may not be included in actual implementation. The canonical element of the dossier file may be implemented using a public key (e.g., included on line 5). For example, the public key may be from a certificate signed by a chain of one or more signing certificates as described about.

In some implementations, a fingerprint of the public key may be obtained and/or use. For example, the fingerprint of the public key may be used as an identifier of the brand (e.g., BRANDID shown on line 1). A fingerprint of a unique public key is also a unique identifier. In some implementations, a fingerprint may be shortened using any technique known to those skilled in the art.

Lines 2-4 may show other information of the example dossier file. Lines 6 and 7 may show the one or more locations where the example dossier file may be located or stored. The different names in different namespaces are shown in lines 9-28. For example, lines 9-12 provide the name "Foo Inc." in namespace [domain name X] and other related information (e.g., "Locator" and "Sig"). Lines 13-16 show name "Foo" in namespace [domain name Y] and other related information. And so on. One place in the dossier file (e.g., last line, line 29) includes a signature of the other parts (e.g., lines 1-28) of the dossier file. The signature may be obtained using the public key, shown on line 5, to sign the contents of lines 1-28 and appended to the end of the dossier file.

A dossier file is extensible and changeable to add, replace, and/or remove names and namespaces. For example, when a brand is adding a new service on a new platform (i.e., adding a new name in a new namespace), the new name, new namespace, and any additional related information are added to the dossier file. The updated dossier file (except the "SIG:" signature) is then resigned with the same public key (e.g., the one shown on line 5) or a new public key of a new certificate (i.e., updating the dossier file includes replacing the public key on line 5 with the new one).

In promoting the new name associated with the brand, the brand owner uses or provides the dossier file associated with the name in providing products and/or services. A potential consumer of the products and/or services may verify the name for trustworthiness and/or reputation (e.g., whether the name belongs to a reputable organization or brand) using the associated dossier file. To verify that the provided dossier file has not been altered, check for the accuracy of the name and namespace in the dossier file, signed the relevant portion of the dossier file (e.g., lines 1 to 28 or 2 to 28) with the key on line 5, and compare the signature with that on line 29. Alternatively or in addition, if the new name (e.g., line 18 or 21) has its own certificate (e.g., line 19) or signing chain (e.g., line 22), the new name may be verify using the certificate or signing chain. After the new name and/or the content of the dossier file are verified, next is to verify that the public key on line 5 is signed by an authoritative source. The authoritative source can be, for example, a third-party CA or an entity root CA with a sufficiently high reputation score (150, FIG. 1).

An entity or organization (business or government) may create, obtain, and/or use numerous brand identifiers for its brands. Two or more brand identifiers may be use one public key. In some implementations, each brand identifier may use its own public key. If a dossier file becomes long or if shorter dossier files are to be implemented, the dossier files linked together in a structure, such as a Merkle tree.

Figure 3:
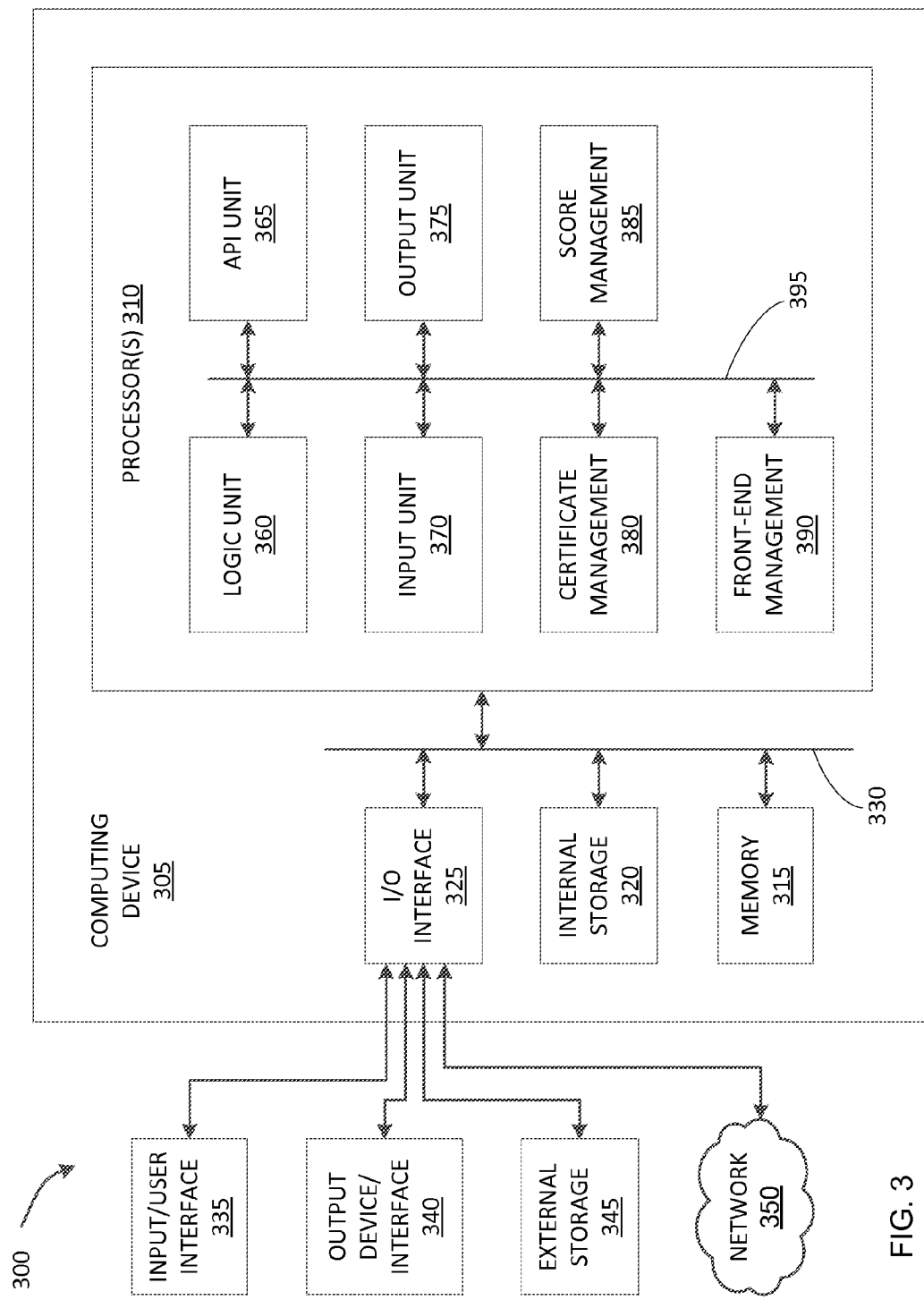
FIG. 3 shows an example computing environment with an example computing device suitable for implementing at least one example implementation.

FIG. 3 shows an example computing environment with an example computing device suitable for implementing at least one example implementation. Computing device 305 in computing environment 300 can include one or more processing units, cores, or processors 310, memory 315 (e.g., RAM, ROM, and/or the like), internal storage 320 (e.g., magnetic, optical, solid state storage, and/or organic), and I/O interface 325, all of which can be coupled on a communication mechanism or bus 330 for communicating information.

Computing device 305 can be communicatively coupled to input/user interface 335 and output device/interface 340. Either one or both of input/user interface 335 and output device/interface 340 can be a wired or wireless interface and can be detachable. Input/user interface 335 may include any device, component, sensor, or interface, physical or virtual, which can be used to provide input (e.g., keyboard, a pointing/cursor control, microphone, camera, braille, motion sensor, optical reader, and/or the like). Output device/interface 340 may include a display, monitor, printer, speaker, braille, or the like. In some example implementations, input/user interface 335 and output device/interface 340 can be embedded with or physically coupled to computing device 305 (e.g., a mobile computing device with buttons or touch-screen input/user interface and an output or printing display, or a television).

Computing device 305 can be communicatively coupled to external storage 345 and network 350 for communicating with any number of networked components, devices, and systems, including one or more computing devices of the same or different configuration. Computing device 305 or any connected computing device can be functioning as, providing services of, or referred to as a server, client, thin server, general machine, special-purpose machine, or other label.

I/O interface 325 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and networks in computing environment 300. Network 350 can be any network or combination of networks (e.g., the Internet, local area network, wide area network, a telephonic network, a cellular network, satellite network, and the like).

Computing device 305 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other nonvolatile storage or memory.

Computing device 305 can be used to implement techniques, methods, applications, processes, or computer-executable instructions to implement at least one implementation (e.g., a described implementation). Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 310 can execute under any operating system (OS) (not shown), in a native or virtual environment. To implement a described implementation, one or more applications can be deployed that include logic unit 360, application programming interface (API) unit 365, input unit 370, output unit 375, certificate management unit 380, score management unit 385, front-end management unit 390, and inter-unit communication mechanism 395 for the different units to communicate with each other, with the OS, and with other applications (not shown). For example, certificate management unit 380, score management unit 385, and front-end management unit 390 may implement one or more processes shown in FIGS. 1 and 2. The described units and elements can be varied in design, function, configuration, or implementation and are not limited to the descriptions provided.

In some example implementations, when information or an execution instruction is received by API unit 365, it may be communicated to one or more other units (e.g., logic unit 360, input unit 370, output unit 375, certificate management unit 380, score management unit 385, front-end management unit 390). For example, after input unit 370 has detected a response from a resource with a certificate, input unit 370 may use API unit 365 to communicate the certificate to certificate management unit 380. Certificate management unit 380 may determine that the root CA is the entity root CA and interact, via API unit 365, with score management unit 385 to detect the reputation score and determine whether the score is above a threshold. Score management unit 385 may then communicate with front-end management unit 390 to warn the user of the low reputation score or communicate with logic unit 360 to establish a secure connection if the reputation score is above the threshold.

In some examples, logic unit 360 may be configured to control the information flow among the units and direct the services provided by API unit 365, input unit 370, output unit 375, certificate management unit 380, score management unit 385, and front-end management unit 390 in order to implement an implementation described above. For example, the flow of one or more processes or implementations may be controlled by logic unit 360 alone or in conjunction with API unit 365.

Although a few example implementations have been shown and described, these example implementations are provided to convey the subject matter described herein to people who are familiar with this field. It should be understood that the subject matter described herein may be embodied in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

What is claimed is:

1. A computer-implemented method, comprising:
   requesting a secure connection with an online resource;
   receiving a certificate from the online resource, wherein the certificate is signed by a chain of at least one certificate authority (CA) with the last CA in the chain being a root CA;
   determining that the root CA is an entity root CA without determining whether the root CA is a third-party root CA, wherein the entity root CA is associated with an entity certificate issued to an entity and the entity is associated with a score;
   determining whether the score is equal to or greater than a threshold;
   for the score determined to be equal to or greater than the threshold, establishing the secure connection with the online resource; and
   for the score determined to be less than the threshold, determining whether or not to establish the secure connection with the online resource based on whether or not an indication of trustworthiness is provided from another source that includes at least one of a requester of the secure connection and a third party, wherein it is determined to establish the secure connection with the online resource when the entity owns another resource with another certificate signed by another chain of at least one other CA, with a last CA in the another chain being any third-party root CA,
   wherein the score of the entity may be changed based on a position of the requester of the secure connection within a social graph of other requesters that interact or have interacted with the entity, such that an input of one of the other requesters that is closer to the requester in the social graph than another one of the other requesters in the social graph has a higher weighting than an input of the another requester.

2. The method of claim 1, wherein the online resource is a resource of a business entity.

3. The method of claim 1, wherein the secure connection is established to access a website, to communicate with an email service, or to authenticate executable instructions.

4. The method of claim 1, wherein determining whether or not to establish the secure connection with the online resource based on whether or not an indication of trustworthiness is provided from another source comprises establishing the secure connection with the online resource when the entity root CA is signed by another chain of at least one other CA, with a last CA in the another chain being any third-party root CA.

5. The method of claim 1, further comprising maintaining an access history to the resource, wherein the score is increased by an increase in the access history.

6. The method of claim 1, further comprising determining an age of the entity or the online resource, wherein the score is increased based on a higher value of the age of the entity or the online resource.

7. A non-transitory computer readable medium having stored therein computer executable instructions for:
   requesting a secure connection with an online resource;
   receiving a certificate from the online resource, wherein the certificate is signed by a chain of at least one certificate authority (CA) with the last CA in the chain being a root CA;
   determining that the root CA is an entity root CA without determining whether the root CA is a third-party root CA, wherein the entity root CA is associated with an entity certificate issued to an entity and the entity is associated with a score;
   determining whether the score is equal to or greater than a threshold;
   for the score equal to or greater than the threshold, establishing the secure connection with the online resource,
   for the score less than the threshold, determining whether or not to establish the secure connection with the online resource based on whether or not an indication of trustworthiness is provided from another source that includes at least one of a requester of the secure connection and a third party, wherein it is determined to establish the secure connection with the online resource when the entity owns another resource with another certificate signed by another chain of at least one other CA, with a last CA in the another chain being any third-party root CA,
   wherein the score of the entity may be changed based on a position of the requester of the secure connection within a social graph of other requesters that interact or have interacted with the entity, such that an input of one of the other requesters that is closer to the requester in the social graph than another one of the other requesters in the social graph has a higher weighting than an input of the another requester.

8. The computer readable medium of claim 7, wherein the secure connection is established to access a website, to communicate with an email service, or to authenticate executable instructions.

9. The computer readable medium of claim 7, wherein the score is set to a level above the threshold if the entity root CA is signed by another chain of at least one other CA, with a last CA in the another chain being any third-party root CA.

10. The computer readable medium of claim 7, wherein the score is set to a level above the threshold if the entity owns another resource with another certificate signed by another chain of at least one other CA, with a last CA in the another chain being any third-party root CA.

11. The computer readable medium of claim 7, further comprising maintaining an access history to the resource, wherein the score is increased by an increase in the access history.

12. The computer readable medium of claim 7, further comprising determining an age of the entity or the online resource, wherein the score is increased based on a higher value of the age of the entity or the online resource.

13. At least one computing device collectively having storage and at least one processor configured to perform:
  requesting a secure connection with an online resource;
  receiving a certificate from the online resource, wherein the certificate is signed by a chain of at least one certificate authority (CA) with the last CA in the chain being a root CA;
  determining that the root CA is an entity root CA without determining whether the root CA is a third-party root CA, wherein the entity root CA is associated with an entity certificate issued to an entity and the entity is associated with a score;
  determining whether the score is equal to or greater than a threshold;
  for the score equal to or greater than the threshold, establishing the secure connection with the online resource; and
  for the score less than the threshold, determining whether or not to establish the secure connection with the online resource based on whether or not an indication of trustworthiness is provided from another source that includes at least one of a requester of the secure connection and a third party, wherein it is determined to establish the secure connection with the online resource when the entity owns another resource with another certificate signed by another chain of at least one other CA, with a last CA in the another chain being any third-party root CA,
  wherein the score of the entity may be changed based on a position of the requester of the secure connection within a social graph of other requesters that interact or have interacted with the entity, such that an input of one of the other requesters that is closer to the requester in the social graph than another one of the other requesters in the social graph has a higher weighting than an input of the another requester.

14. The at least one computing device claim 13, wherein the secure connection is established to access a website, to communicate with an email service, or to authenticate executable instructions.

15. The at least one computing device claim 13, wherein the score is set to a level above the threshold if the entity root CA is signed by another chain of at least one other CA, with a last CA in the another chain being any third-party root CA.

16. The at least one computing device claim 13, wherein the score is set to a level above the threshold if the entity owns another resource with another certificate signed by another chain of at least one other CA, with a last CA in the another chain being any third-party root CA.

17. The at least one computing device claim 13, further comprising maintaining an access history to the resource, wherein the score is increased by an increase in the access history.

18. The at least one computing device claim 13, further comprising determining an age of the entity or the online resource, wherein the score is increased based on a higher value of the age of the entity or the online resource.

19. The method of claim 1, wherein the score may be increased by a positive factor comprising at least one of the age of the resource, the age of the entity, a history of access to a resource owned by the entity, a history of one or more other resources associated with the entity, and a user rating; and wherein the score may be decreased by a negative user rating.

* * * * *